(12) United States Patent
Salsich et al.

(10) Patent No.: US 9,931,708 B2
(45) Date of Patent: Apr. 3, 2018

(54) AUTOMATIC CONSUMABLE AND TORCH LENGTH DETECTION VIA PRESSURE DECAY

(75) Inventors: Anthony V. Salsich, Appleton, WI (US); Jeremy D. Overesch, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 2990 days.

(21) Appl. No.: 12/209,238

(22) Filed: Sep. 12, 2008

(65) Prior Publication Data

US 2009/0008370 A1 Jan. 8, 2009

Related U.S. Application Data

(63) Continuation-in-part of application No. 11/460,446, filed on Jul. 27, 2006, now Pat. No. 8,710,396.

(60) Provisional application No. 61/056,752, filed on May 28, 2008.

(51) Int. Cl.
*B23K 10/00* (2006.01)
*H05H 1/36* (2006.01)

(52) U.S. Cl.
CPC ............ *B23K 10/006* (2013.01); *H05H 1/36* (2013.01)

(58) Field of Classification Search
CPC ........... H05H 1/34; B23K 10/00; B23K 10/02
USPC ............... 219/121.36, 121.48, 121.5, 121.58
See application file for complete search history.

(56) References Cited

U.S. PATENT DOCUMENTS

| | | | |
|---|---|---|---|
| 4,133,988 A | 1/1979 | Esibyan et al. | |
| 4,175,225 A | 11/1979 | Holko et al. | |
| 5,424,507 A | 6/1995 | Yamaguchi | |
| 5,695,662 A * | 12/1997 | Couch et al. | 219/121.39 |
| 6,326,583 B1 * | 12/2001 | Hardwick et al. | 219/121.55 |
| 6,420,672 B1 | 7/2002 | Ulrich et al. | |
| 6,689,983 B2 | 2/2004 | Homer-Richardson et al. | |
| 6,772,040 B1 | 8/2004 | Picard et al. | |
| 6,960,737 B2 | 11/2005 | Tatham | |
| 2004/0069752 A1 | 4/2004 | Ulrich et al. | |
| 2005/0061784 A1 * | 3/2005 | Matus | 219/121.54 |
| 2006/0049152 A1 * | 3/2006 | Matus | 219/121.54 |
| 2006/0138115 A1 | 6/2006 | Norrish et al. | |
| 2006/0163216 A1 | 7/2006 | Brandt et al. | |
| 2006/0163220 A1 | 7/2006 | Brandt et al. | |
| 2008/0023451 A1 | 1/2008 | Salsich et al. | |
| 2009/0032502 A1 | 2/2009 | Eickhoff et al. | |

FOREIGN PATENT DOCUMENTS

| | | |
|---|---|---|
| DE | 19536150 A1 | 4/1997 |
| EP | 1655095 A2 | 5/2006 |

* cited by examiner

*Primary Examiner* — Thomas Ward
(74) *Attorney, Agent, or Firm* — McAndrews, Held & Malloy, Ltd.

(57) ABSTRACT

A system and method for a plasma system includes a plasma torch actuated by a trigger, a consumable installed in the plasma torch, and a gas flow system constructed to receive pressurized gas and provide a gas flow to the plasma torch. A gas flow regulating system is included and configured to regulate the gas flow, and a sensing device is included and configured to monitor a gas pressure in the plasma torch. The plasma system also includes a controller configured to receive a signal from the sensing device and to determine one of a length parameter of the plasma torch and a type of the consumable therefrom.

22 Claims, 4 Drawing Sheets

AUTOMATIC CONSUMABLE AND TORCH LENGTH DETECTION VIA PRESSURE DECAY

CROSS-REFERENCE TO RELATED APPLICATION

The present application is a non-provisional of, and claims priority to, U.S. Provisional Application Ser. No. 61/056,752, filed May 28, 2008, and is a continuation in part of and claims priority of U.S. patent application Ser. No. 11/460,446 filed Jul. 27, 2006, the disclosures of which is incorporated herein.

BACKGROUND OF THE INVENTION

The present invention relates generally to plasma cutting/gouging systems and, more particularly, to an apparatus and method for automatically detecting plasma cutting/gouging parameters via pressure decay. Typically, to perform a plasma cutting operation, a user must install the proper cutting consumables to the plasma torch, adjust the gas pressure supplied to the plasma torch, and adjust the pilot current supplied to the plasma torch by placing a user interface selector switch to the proper position. To change over to a plasma gouging operation, the user must install a different set of consumables to the plasma torch, readjust the gas pressure supplied to the plasma torch, and toggle the user interface selector switch to a gouging position, which will adjust the pilot current to a level sufficient for gouging. The change from a plasma cutting operation over to a plasma gouging operation and vice-versa helps to ensure that the correct plasma parameters are set to optimal levels for the type of consumable for the operation to be performed. However, an inexperienced or careless user may not properly set the levels for the type of consumable for the operation to be performed.

Additionally, when a different length of torch is installed on a plasma power source, a longer length of hose will cause a different pressure drop through the length of the torch than a shorter length of hose. As such, the pressure at the torch head may be either greater or lesser than the desired pressure, depending on the torch length. A user will typically not adjust a manually controlled gas system to an optimal level based on torch length. Therefore cutting performance, arc stability, and consumable life may be less than optimal.

It would therefore be desirable to have an apparatus and method capable of detecting the consumable type or length of torch installed on the plasma power source and capable of automatically adjusting plasma operation parameters to an optimal level.

BRIEF DESCRIPTION OF THE INVENTION

The present invention provides a system and method of determining plasma operation parameters that overcome the aforementioned drawbacks. A plasma cutting/gouging system includes a controller configured to determine the plasma operation parameters based on a monitored gas pressure in a plasma torch.

Therefore, in accordance with an aspect of the present invention, a plasma system includes a plasma torch actuated by a trigger, a consumable installed in the plasma torch, and a gas flow system constructed to receive pressurized gas and provide a gas flow to the plasma torch. A gas flow regulating system is included and configured to regulate the gas flow, and a sensing device is included and configured to monitor a gas pressure in the plasma torch. The plasma system also includes a controller configured to receive a signal from the sensing device and to determine one of a length parameter of the plasma torch and a type of the consumable therefrom.

According to another aspect of the present invention, a method of controlling a plasma system includes supplying pressurized gas to a plasma torch and monitoring a gas pressure fall time in the plasma torch. A parameter of the plasma system based on the monitored gas pressure fall time is determined.

According to yet another aspect of the present invention, a plasma system includes a housing, a power source disposed within the housing constructed to generate plasma cutting power, and a plasma torch actuated by a trigger and connected to the power source. A consumable is positioned in the plasma torch. The plasma system includes a gas flow system constructed to receive a pressurized gas and to regulate gas flow, a sensing device, and a controller configured to receive a signal from the sensing device during a gas purge and to determine a plasma operating parameter therefrom, the plasma operation parameter selected from the group consisting of a length of the plasma torch and a type of the consumable.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
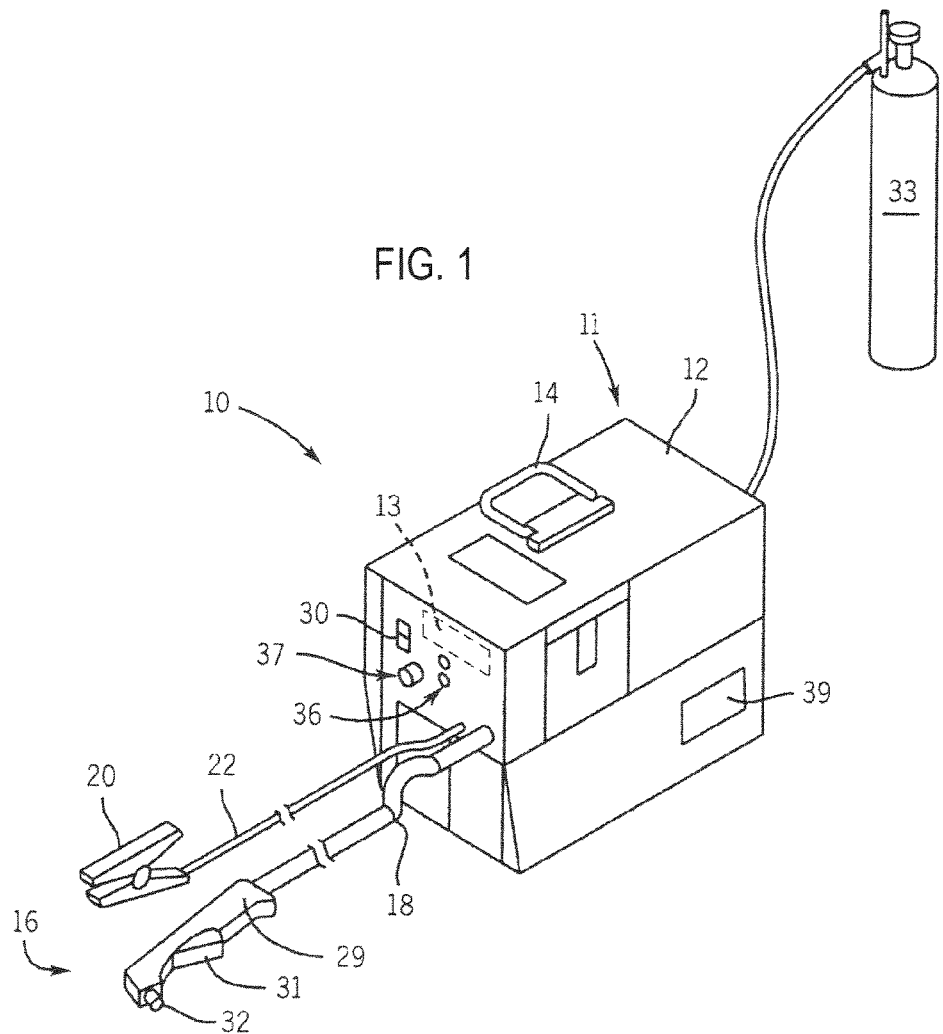
FIG. 1 is a perspective view of a plasma cutting/gouging system according to an embodiment of the invention.

FIG. 1 shows a plasma cutting/gouging system 10 according to the present invention. Plasma cutting/gouging system 10 is a high voltage system with open circuit output voltages that typically range from approximately 230 Volts Direct Current (VDC) to over 300 VDC. Plasma cutting/gouging system 10 includes a power source 11 to condition raw power and generate a power signal suitable for plasma cutting/gouging applications, such as cutting and gouging. Power source 11 includes a housing 12. A controller 13 receives operational feedback and monitors the operation of plasma cutting/gouging system 10. Power source 11 includes a handle 14 to effectuate transportation from one site to another. Connected to power source 11 is a torch 16 including a cable 18 and a torch body 29. Cable 18 provides torch body 29 with power and compressed air or gas, and also serves as a communications link between torch body 29 and power source 11. Torch body 29 has a trigger 31 thereon and a work tip 32 extending therefrom. Although shown as attached to torch 16, it is understood and within the scope of the claims that trigger 31 could be connected to power source 11 or otherwise remotely positioned relative to actuating torch 16.

Also connected to power source 11 is a work clamp 20, which is designed to connect to a workpiece (not shown) to be cut and provide a grounding or return path. Connecting work clamp 20 to power source 11 is a cable 22 designed to provide the return path, or grounding path, for the cutting current from torch 16 through the workpiece and work clamp 20. Power source 11 includes a plurality of inputs such as an ON/OFF switch 30 and may also include amperage controls and indicator lights 36.

To effectuate cutting, torch 16 is placed in close proximity to the workpiece connected to clamp 20. A user then activates trigger 31 on torch 16 to deliver electrical power and compressed air to work tip 32 of torch 16 to initiate a new arc and plasma jet. Shortly thereafter, a cutting arc is generated as the user moves the torch to the workpiece. The arc transfers from the electrode (not shown) to the workpiece through the tip. The user may then perform the desired plasma effectuated processing of the workpiece by moving torch 16 across the workpiece. The user may adjust the speed of the cut to reduce spark spatter and provide a more-penetrating cut by adjusting amperage and/or air pressure. Gas is supplied to torch 16 from a pressurized gas source 33, from an internal air compressor 39, or an air compressor (not shown) external to power source 11.

Figure 2:
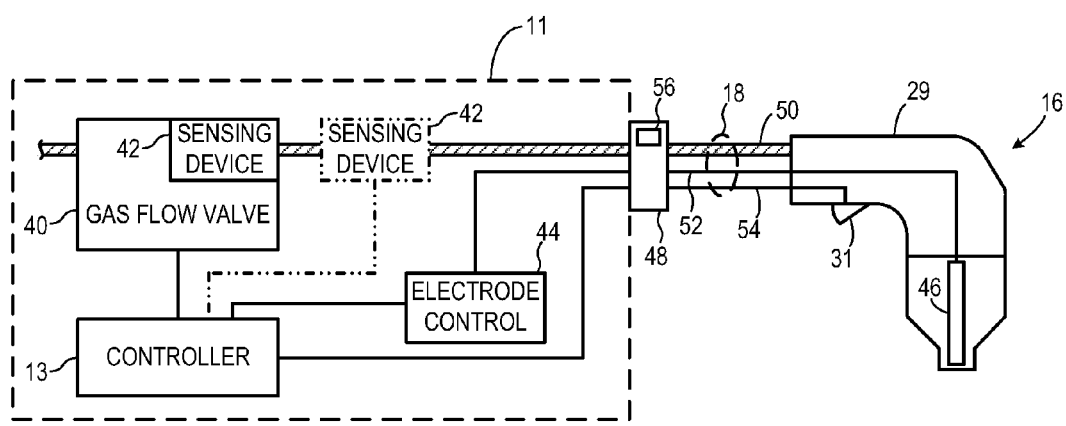
FIG. 2 is a schematic representation of the plasma cutting/gouging system shown in FIG. 1 according to an embodiment of the invention.

FIG. 2 is a schematic representation of the plasma cutting/gouging system shown in FIG. 1 according to an embodiment of the invention. As shown, in one embodiment, controller 13, is disposed within power source 11. Controller 13 is configured to automatically select a desired mode of operation of the plasma cutting/gouging system 10 based on gas pressure decay in torch 16 as will be described hereinbelow. Each mode of operation corresponds to a specific set of gas pressure and gas flow set points. The set points will exemplify ideal operating conditions for the plasma cutting/gouging system 10 for each mode of operation. Controller 13 is configured to store information regarding the gas pressure and gas flow set points for each desired mode of operation.

Controller 13 is operatively connected to a gas flow valve 40, a pressure sensor or sensing device 42, and trigger 31. Controller 13 is configured to calculate a drive signal to be sent to gas flow valve 40 once trigger 31 of plasma torch 16 is actuated. It is contemplated that the drive signal can be either a current or a voltage. In an embodiment of the invention, gas flow valve 40 is a solenoid-type proportional valve capable of actively adjusting gas flow and/or pressure based on a control signal sent thereto. Sensing device 42 is a pressure sensor used to measure output gas pressure from gas flow valve 40 and along cable 18 of torch 16. The pressure sensor can be a piezo-resistive pressure sensor or any other similar sensor capable of measuring gas pressure in a welding-type environment. An output gas pressure and/or gas flow measured by sensing device 42 at gas flow valve 40 is communicated to controller 13, which dynamically controls gas flow valve 40 based on the feedback from sensing device 42 to regulate the gas pressure used in the cutting operation for the plasma cutting/gouging system 10. In this manner, sensing device 42 may be used to monitor the outlet pressure of proportional valve 40 and provide that data to a control loop that adjusts proportional valve 40 to maintain the desired outlet pressure, regardless of fluctuations in the input pressure.

In an embodiment of the invention, sensing device 42 is integral with or integrally combined with gas flow valve 40 so as to form a single unit. However, it is contemplated, as shown in phantom, that sensing device 42 may instead be a unit separate from gas flow valve 40 and may measure gas flow downstream from gas flow valve 40. Accordingly, a sensing device integral with gas flow valve 40 may not be needed.

Controller 13 is additionally operatively connected to an electrode control 44 configured to transfer plasma cutting/gouging power to an electrode 46. In an embodiment of the invention, controller 13 sends a command signal to electrode control 44 to transfer plasma cutting/gouging power to electrode 46 when trigger 31 has been actuated and sends a command signal to electrode control 44 to halt the transfer of plasma cutting/gouging power to electrode 46 when trigger 31 has been released.

Cable 18 extends between a cable connector 48 and torch body 29. Cable 18 includes a gas hose 50, an electrode power cable 52, and a trigger cable 54. Torch 16, including cable 18 and torch body 29, may be connected and disconnected from power source 11 via cable connector 48. In one embodiment, cable connector 48 includes one or more electrical jumpers 56 configured to identify parameters of torch 16 to power source 11 and controller 13 such a length of torch 16.

It should be noted that the valve identified as a "proportional valve" in the above description, is not limited to a valve whose flow rate or pressure is directly proportional to voltage or current applied to its control. Rather, it is meant to imply a valve whose output changes incrementally with applied voltage or current and is not an "on-off" type valve. Voltage or current can be used to determine the valve limits, as can an auxiliary position indicator in communication with the moving part of the solenoid in the valve. There may also be other additional ways to determine valve position or the limits of its operation.

Figure 3:
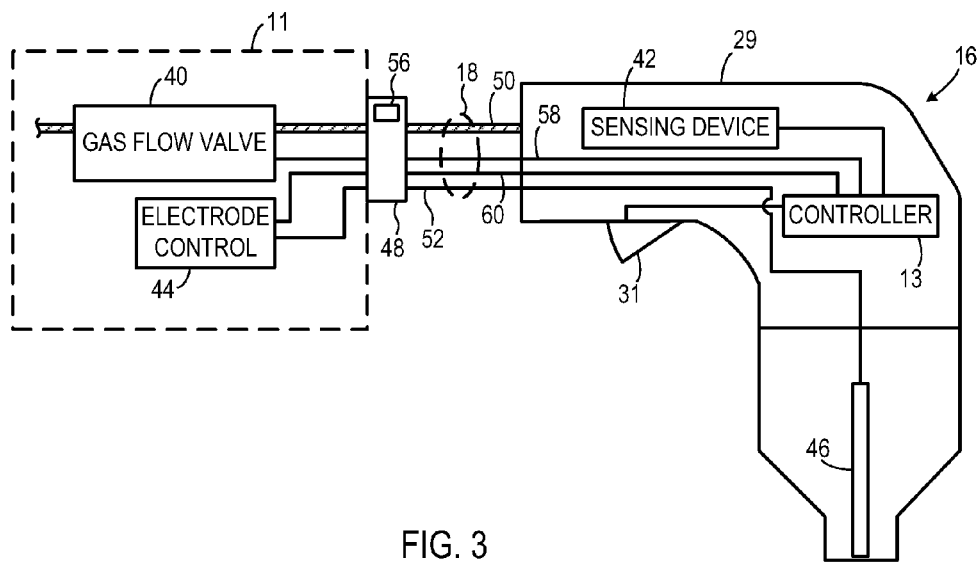
FIG. 3 is a schematic representation of the plasma cutting/gouging system shown in FIG. 1 according to another embodiment of the invention.

FIG. 3 is a schematic representation of the plasma cutting/gouging system shown in FIG. 1 according to another embodiment of the invention. Rather than being disposed within power source 11, FIG. 3 shows that controller 13 and sensing device 42 are disposed within torch body 29. Accordingly, cable 18 includes gas hose 50 and electrode power cable 52. However, since controller 13 is located in torch body 29, cable 18 does not need to include trigger cable 54, which is connected between trigger 31 and controller 13, as shown in FIG. 2. Instead, as shown in FIG. 3, cable 18 includes a gas flow valve cable 58 and an electrode control cable 60 for coupling controller 13 to gas flow valve 40 and electrode control 44, respectively.

Figure 4:
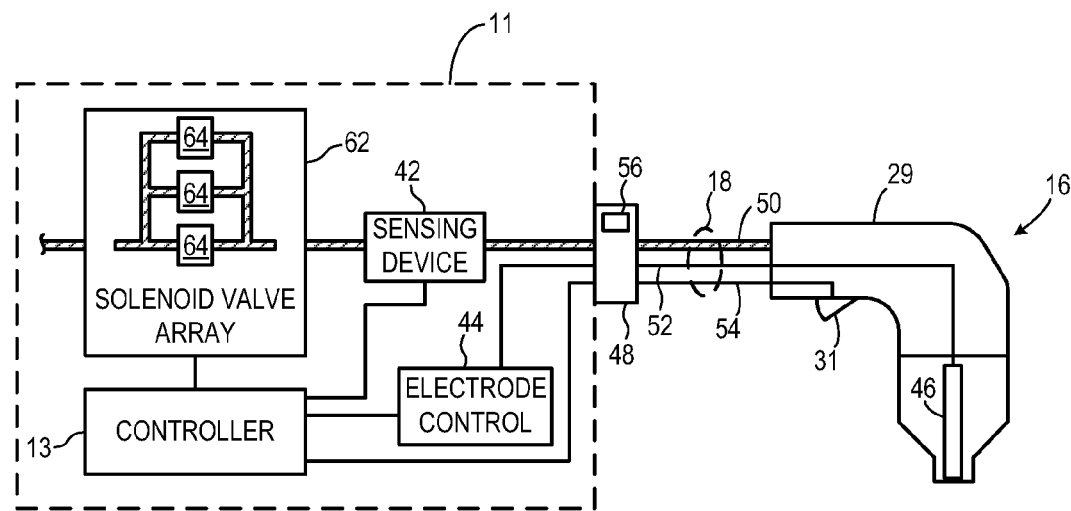
FIG. 4 is a schematic representation of the plasma cutting/gouging system shown in FIG. 1 according to another embodiment of the invention.

FIG. 4 shows a schematic representation of the plasma cutting/gouging system shown in FIG. 1 according to another embodiment of the invention. As shown, controller 13 is operatively connected to a solenoid valve array 62, sensing device 42, and trigger 31. Solenoid valve array 62 includes one or more valves 64 that are fluidly connected to one another in parallel. Solenoid valve array 62 is electrically connected to controller 13. Such a construction allows the one or more valves 64 to be individually controlled by feedback communicated thereto from the controller 13 in response to output gas pressure readings in the plasma cutting/gouging system 10 as measured by sensing device 42. Each valve 64 may be configured to regulate gas flow to an independent and fixed pressure. The valves 64 then control gas flow to the torch 16.

Embodiments of the invention provide automation and optimization of plasma cutting or gouging parameters based on the type of plasma operation desired. By detecting the type of consumable installed on plasma torch 16 (i.e., cutting or gouging), parameters of power source 11 such as gas pressure and pilot current may be automatically adjusted to optimal levels for the type of operation. This adjustment is completed without requiring input from the user. That is, the user is not required to manually adjust gas pressure or select the cutting or gouging process via a user interface selector switch. The automation and optimization provide convenience to the user when switching from plasma cutting to plasma gouging.

In addition, embodiments of the invention provide detection of the length of plasma torch 16 installed on power supply 11 and provide optimization of the gas pressure and other parameters for that specific torch length. By optimizing parameters such as gas pressure, the user will experience better cut performance with a more stable arc and longer consumable life.

Figure 5:
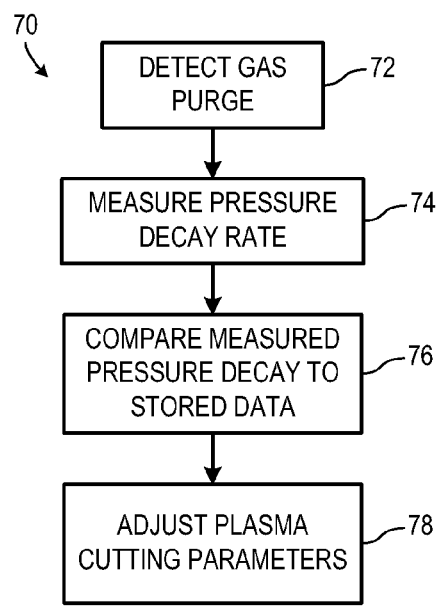
FIG. 5 is a flow chart showing a technique for detecting plasma system parameters via pressure decay according to an embodiment of the invention.

FIG. 5 shows a technique 70 for detecting plasma system parameters via pressure decay according to an embodiment of the invention. Technique 70 begins with detecting that gas pressure is being purged from the plasma torch 72. The gas pressure purge may be detected, in one embodiment, by detecting a trigger release of the torch, thus extinguishing the plasma arc. In another embodiment, a pressure sensor, which is connected to the outlet of a gas pressure regulating valve, may be used to detect that gas pressure in the torch has crossed a purge pressure threshold.

After a gas pressure purge cycle has been detected 72, a rate of gas pressure decay of gas flow through the torch is measured and monitored 74. Plasma cutting-type consumables typically create more gas flow restriction than gouging-type consumables due to a more narrowly focused plasma arc for cutting. Conversely, gouging consumables create less gas flow restriction because of the desire for the gouging arc to be wider which therefore removes a greater amount of material. Starting with a fully pressurized torch, cutting consumables will cause the rate of pressure decay to be less than that of gouging consumables when gas pressure is purged from the torch. A length of the plasma torch similarly varies depending on the length. A longer plasma torch has a greater length and, therefore, a greater volume of gas hose contained in the torch lead. A longer hose takes a longer time to purge gas pressure from the fully pressurized state. Therefore, the pressure decay rate will be slower for a longer length or volume of gas hose than for a smaller length. Accordingly, the pressure sensor is used to measure the rate of pressure decay.

After the pressure decay rate is measured 74, the pressure decay rate data is then passed on to a controller, such as controller 13 programmed to control the gas pressure regulating valve, and the controller compares the measured pressure decay rate data to stored pressure decay rate data 76 that are unique to the various types of consumables that may be installed in the plasma torch and/or unique to the various types of torch lengths used for plasma cutting/gouging operations. The controller may be positioned in the plasma power source or in the plasma torch. Once a pressure decay rate is measured 74 and compared 76 to the pre-programmed decay rates, the controller can adjust parameters 78 such as the gas pressure command for the gas pressure regulating valve or the pilot current level supplied to the torch. The parameters will be set to predetermined optimal levels based on the type of consumables installed or based on the length of plasma torch connected to the plasma cutting/gouging system.

Figure 6:
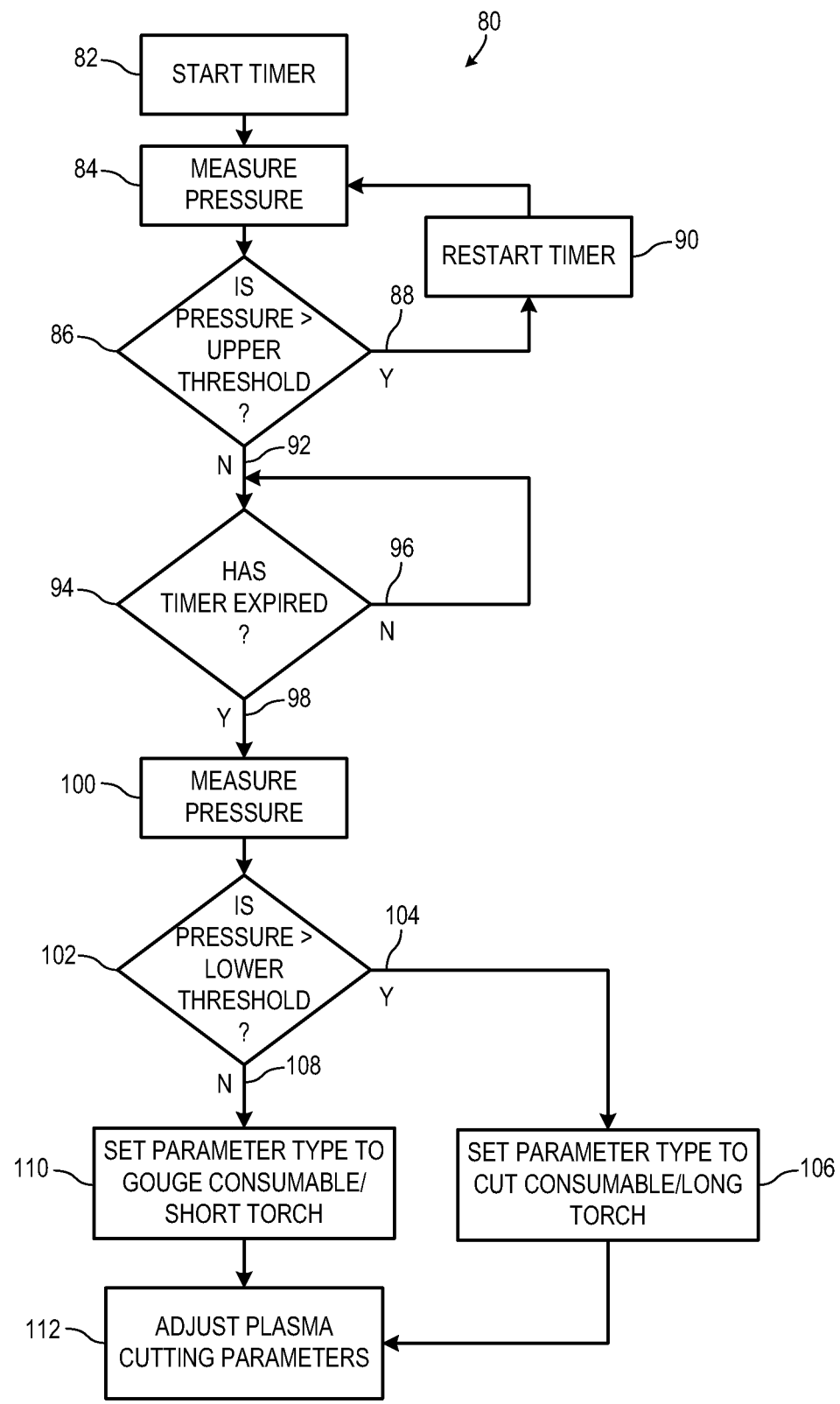
FIG. 6 is a flow chart showing a technique for detecting plasma system parameters via pressure decay according to another embodiment of the invention.

FIG. 6 shows a technique 80 for detecting plasma system parameters via pressure decay according to an embodiment of the invention. Technique 80 begins with starting a timer 82. A pressure is then measured 84 in the gas flow path downstream from a flow regulating valve, such as gas flow valve 40 or solenoid valve array 62 described above. The measured pressure is compared to an upper threshold 86 to determine whether or not gas in the gas flow path is in a purge state. If the measured pressure is above the upper threshold 88, then the gas flow path is determined to not be in a purge state, and the timer is restarted 90 or reset to an initial value. While the pressure of the gas in the gas flow path is measured and determined to be above the upper threshold, STEPS 84-90 of technique 80 will continue to run in a loop.

Once the measured pressure crosses over or falls below the upper threshold 92, a timing loop is run. The timing loop includes determining whether the timer has expired 94. If the timer has not expired 96, timer expiration is checked 94 again. Expiration of the timer may occur, for example, when the timer has reached a preset value. The present value may be predetermined and programmed into controller 13 and may correspond to the time after purging has begun in which a pressure of the gas remaining in the gas flow path is indicative of the torch length or consumable type. In one embodiment, if the torch length is known, the timer expiration may be set such that a determination between a cut consumable and a gouge consumable may be determined. In addition, the timer expiration may vary between a shorter torch length versus a longer torch length.

Accordingly, after the timer has expired 98, the gas pressure remaining in the gas flow path is measured 100 and compared to a lower threshold 102. If the measured pressure is greater than the lower threshold 104, then the type of consumable installed in the plasma torch may be set 106 to a cut consumable type or the torch length may be set to a long torch length, for example. If the measured pressure is lower than the lower threshold 108, then the type of consumable installed in the plasma torch may be set to a gouge consumable 110 type or the torch length may be set to a short torch length, for example. Technique 80 includes optimizing and adjusting parameters 112 such as the gas pressure command for the gas pressure regulating valve or the pilot current level supplied to the torch. The parameters will be set to predetermined optimal levels based on the type of consumables installed or based on the length of plasma torch connected to the plasma cutting/gouging system.

In an embodiment of the invention, techniques 70 and 80 may be used to simultaneously measure the pressure decay rate for both the type of consumable installed in the plasma torch and the length of torch connected to the plasma cutting/gouging system when the pressure decay rate for the type of consumable and the pressure decay rate of the torch do not overlap. In this manner, both the gas pressure command for the gas pressure regulating valve and the pilot current level supplied to the torch may be optimized.

However, when the pressure decay rate for the type of consumable and the pressure decay rate of the torch overlap, separating their respective pressure decay rates from the measured pressure decay rate may not be possible. As such, one of the pressure decay rates may be assumed or independently determined while the other pressure decay rate may be determined as a measure of pressure fall time. For example, the electrical jumpers 56 in cable connector 48 may be set to indicate torch length, while the pressure decay rate for the type of consumable installed in the plasma torch may be determined via embodiments of the invention described herein. Alternatively, the electrical jumpers 56 in cable connector 48 may be set to indicate the type of consumable installed in the plasma torch, while the pressure decay rate for torch length may be determined via embodiments of the invention described herein. In this manner, the electrical jumpers 56 in cable connector 48 may allow for automatic determination of torch length or consumable type such that user input thereof is not needed. However, it is contemplated that power source 11 may include a user input, such as a switch or button, to allow user selection of one of the torch length or consumable type.

When first initialized or at startup, the plasma cutting/gouging operation may not have allowed controller 13 to process technique 70 or technique 80 before the first plasma cut/gouge such that the type of consumable or the torch length may be automatically determined by controller 13. That is, the first plasma cutting/gouging operation might be performed by a user before gas is purged from the gas flow path. Accordingly, if controller 13 is called upon to control gas flow valve 40 or solenoid valve array 62 to control the flow of gas for a plasma cutting/gouging operation before controller 13 has determined the type of consumable or torch length via techniques 70, 80 as described above, controller 13 may be configured to use default plasma cutting/gouging parameters until the plasma cutting/gouging parameters may be determined. In an embodiment of the invention, the default plasma cutting/gouging parameters include a consumable type set to a cutting type and a torch length set to a short torch length. A gouging mode typically has a lower gas flow pressure and a higher current than a cutting mode. However, it is desirable to first assume a cutting mode even when performing a plasma cutting operation using a gouge consumable because performing a plasma gouging operation using a cut consumable tends to wear out the cut consumable more quickly than performing a plasma cutting operation using a gouge consumable.

Accordingly, embodiments of the invention use the data supplied from the pressure sensor during a period when gas pressure is being purged from the from the plasma torch to determine the type of consumable installed on the torch and/or the torch length. By monitoring the rate of pressure decay during the purge cycle, the plasma cutting/gouging system can automatically determine the type of consumable and/or the length of the torch and automatically set optimal plasma cutting/gouging parameters therefrom.

Therefore, in accordance with an embodiment of the present invention, a plasma system includes a plasma torch actuated by a trigger, a consumable installed in the plasma torch, and a gas flow system constructed to receive pressurized gas and provide a gas flow to the plasma torch. A gas flow regulating system is included and configured to regulate the gas flow, and a sensing device is included and configured to monitor a gas pressure in the plasma torch. The plasma system also includes a controller configured to receive a signal from the sensing device and to determine one of a length parameter of the plasma torch and a type of the consumable therefrom.

According to another embodiment of the present invention, a method of controlling a plasma system includes supplying pressurized gas to a plasma torch and monitoring a gas pressure fall time in the plasma torch. A parameter of the plasma system based on the monitored gas pressure fall time is determined.

According to yet another embodiment of the present invention, a plasma system includes a housing, a power source disposed within the housing constructed to generate one of a plasma cutting power and a plasma gouging power, and a plasma torch actuated by a trigger and connected to the power source. A consumable is positioned in the plasma torch. The plasma system includes a gas flow system constructed to receive a pressurized gas and to regulate gas flow, a sensing device, and a controller configured to receive a signal from the sensing device during a gas purge and to determine a plasma operating parameter therefrom, the plasma operation parameter selected from the group consisting of a length of the plasma torch and a type of the consumable.

What is claimed is:

1. A plasma system comprising:
   a plasma torch actuated by a trigger;
   a consumable installed in the plasma torch;
   a gas flow system constructed to receive pressurized gas and provide a gas flow to the plasma torch;
   a gas flow regulating system configured to regulate the gas flow;
   a sensing device configured to monitor a gas pressure in the plasma torch; and
   a controller configured to receive a signal from the sensing device and to determine one of a length parameter of the plasma torch and a type of the consumable therefrom.

2. The plasma system of claim 1 wherein the controller is further configured to determine a purging state of the gas pressure.

3. The plasma system of claim 1 wherein the controller, in being configured to determine one of the length parameter of the plasma torch and the type of the consumable from the signal, is configured to compare pressure decay data for the one of the length parameter of the plasma torch and the type of the consumable with predetermined pressure decay data.

4. The plasma system of claim 3 wherein the controller is further configured to automatically adjust plasma operating parameters based on the comparison.

5. The plasma system of claim 4 wherein the plasma operating parameters are selected from the group consisting of a gas pressure and a pilot current level.

6. The plasma system of claim 1 wherein the controller, in being configured to determine one of the length parameter of the plasma torch and the type of the consumable from the signal, is configured to determine the gas pressure in the plasma torch after a pre-determined time.

7. The plasma system of claim 6 wherein the controller, in being configured to determine one of the length parameter of the plasma torch and the type of the consumable from the signal, is configured to determine the length parameter to be a first length if the determined gas pressure is above a pre-determined value after the pre-determined time and to determine the length parameter to be a second length if the determined gas pressure is below a pre-determined value after the pre-determined time, wherein the first length is longer than the second length.

8. The plasma system of claim 6 wherein the controller, in being configured to determine one of the length parameter of the plasma torch and the type of the consumable from the signal, is configured to determine the type of the consumable to be a plasma cutting type if the determined gas pressure is above a pre-determined value after the pre-determined time and to determine the type of the consumable to be a plasma gouging type if the determined gas pressure is below a pre-determined value after the pre-determined time.

9. The plasma system of claim 1 wherein gas flow system comprises a proportional valve and wherein the controller is further configured to cause the proportional valve to regulate the gas flow based on the signal from the sensing device.

10. The plasma system of claim 9 wherein the proportional valve comprises the sensing device.

11. The plasma system of claim 1 wherein gas flow system comprises a plurality of solenoid valves fluidly connected in parallel and wherein the controller is further configured to cause the plurality of solenoid valves to regulate the gas flow based on the signal from the sensing device.

12. A plasma system comprising:
a housing;
a power source disposed within the housing constructed to generate one of a plasma cutting power and a plasma gouging power;
a plasma torch actuated by a trigger and connected to the power source;
a consumable positioned in the plasma torch;
a gas flow system constructed to receive a pressurized gas and to regulate gas flow;
a sensing device; and
a controller configured to receive a signal from the sensing device during a gas purge and to determine a plasma operating parameter therefrom, the plasma operating parameter selected from the group consisting of a length of the plasma torch and a type of the consumable.

13. The plasma system of claim 12 wherein the controller is configured to control the gas flow system to regulate the gas flow based on the determined length of the plasma torch.

14. The plasma system of claim 12 wherein the controller is configured to control the power source to regulate a pilot current level based on the determined consumable type.

15. A plasma torch system comprising:
a gas flow system configured to receive pressurized gas and provide a gas flow to a plasma torch;
a gas flow regulating system configured to regulate the gas flow;
a sensing device configured to monitor a gas pressure in the plasma torch; and
a controller configured to receive a signal from the sensing device and to determine one of a length parameter of the plasma torch and a type of consumable installed in the plasma torch therefrom.

16. The plasma torch system of claim 15, comprising a power source, wherein the power source comprises the sensing device and the controller.

17. The plasma torch system of claim 15, comprising the plasma torch.

18. The plasma torch system of claim 17, comprising the consumable installed in the plasma torch.

19. The plasma torch system of claim 15, wherein the controller is further configured to determine a purging state of the gas pressure.

20. The plasma torch system of claim 15, wherein the controller is configured to compare pressure decay data for the one of the length parameter of the plasma torch and the type of the consumable with predetermined pressure decay data.

21. The plasma torch system of claim 15, wherein the gas flow system comprises a proportional valve, wherein the controller is configured to cause the proportional valve to regulate the gas flow based on the signal from the sensing device.

22. The plasma torch system of claim 21, wherein the proportional valve comprises the sensing device.

* * * * *